(12) United States Patent
Kouchi et al.

(10) Patent No.: US 8,939,620 B2
(45) Date of Patent: Jan. 27, 2015

(54) SADDLE-RIDING TYPE AUTOMOTIVE VEHICLE

(71) Applicant: Kawasaki Jukogyo Kabushiki Kaisha, Hoygo (JP)

(72) Inventors: Kaoru Kouchi, Kakogawa (JP); Yuu Shibuta, Kobe (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 52 days.

(21) Appl. No.: 13/686,672

(22) Filed: Nov. 27, 2012

(65) Prior Publication Data

US 2013/0163263 A1   Jun. 27, 2013

(30) Foreign Application Priority Data

Dec. 21, 2011 (JP) ................................ 2011-279359
Dec. 21, 2011 (JP) ................................ 2011-279360

(51) Int. Cl.
*F21V 33/00* (2006.01)
*B62J 6/02* (2006.01)

(52) U.S. Cl.
CPC .............. *B62J 6/02* (2013.01); *B62K 2202/00* (2013.01)
USPC .......................................... 362/476; 362/475

(58) Field of Classification Search
CPC ............ B62J 17/00; B62J 13/00; B62K 19/40
USPC .................................................. 362/476, 475
See application file for complete search history.

(56) References Cited

U.S. PATENT DOCUMENTS

| 4,620,713 | A * | 11/1986 | Sakaguchi | 280/152.3 |
| 7,556,410 | B2 * | 7/2009 | Nakano et al. | 362/469 |
| 7,762,699 | B2 * | 7/2010 | Reiners et al. | 362/545 |
| 2004/0264204 | A1 * | 12/2004 | Toyofuku | 362/473 |
| 2006/0023462 | A1 * | 2/2006 | Uemoto et al. | 362/475 |
| 2006/0193143 | A1 * | 8/2006 | Ohira | 362/473 |
| 2007/0058381 | A1 * | 3/2007 | Domoto et al. | 362/475 |
| 2007/0177400 | A1 | 8/2007 | Tatsukawa | |
| 2007/0236949 | A1 * | 10/2007 | Kurihara | 362/475 |
| 2011/0148149 | A1 * | 6/2011 | Hayashi et al. | 296/192 |
| 2011/0149588 | A1 * | 6/2011 | Schnerr et al. | 362/545 |

FOREIGN PATENT DOCUMENTS

| CN | 101825251 | 9/2010 |
| EP | 2 208 663 | 7/2010 |
| JP | 2007-207527 | 8/2007 |
| JP | 2009-073324 | 4/2009 |
| JP | 2010-125898 | 6/2010 |

OTHER PUBLICATIONS

European Patent Application No. 12197165.9 Extended European Search Report dated Jul. 10, 2013, 4 pages.

* cited by examiner

*Primary Examiner* — Evan Dzierzynski (57) ABSTRACT

A headlamp device (18) having left and right pairs of lamp units (20) is disposed inwardly of a front fairing (14) to enclose a front portion of an automotive vehicle. Each of the lamp units (20) is a direct lighting type and includes two light emitting portions (34, 35), on which circuit boards (30, 31) having LED chips (32, 33) mounted thereon, and two lens portions (36, 37) for projecting light, emerging from the light emitting portions (34, 35), in a direction outwardly of the vehicle widthwise direction. The front fairing (14) is so formed as to bulge gradually laterally and upwardly of the vehicle widthwise direction from a tip portion (14a) in a rearward direction, and the headlight device (18) is disposed proximate to a lower end of the front fairing (14).

17 Claims, 6 Drawing Sheets

SADDLE-RIDING TYPE AUTOMOTIVE VEHICLE

CROSS REFERENCE TO THE RELATED APPLICATION

This application is based on and claims Convention priority to Japanese patent applications No. 2011-279359 and No. 2011-279360, both filed Dec. 21, 2011, the entire disclosures of both of which are herein incorporated by reference as a part of this application.

BACKGROUND OF THE INVENTION

1. Field of the Invention

The present invention relates to a saddle-riding type automotive vehicle equipped with a headlamp device comprised of a lamp unit mounted on a front fairing enclosing a front portion of such automotive vehicle.

2. Description of Related Art

The saddle-riding type automotive vehicle such as, for example, a motorcycle, has been known, in which a headlamp device is mounted on a front fairing enclosing a front portion of such automotive vehicle and an LED (light emitting diode) is utilized as a light emitting element thereof (See, for example, the JP Laid-open Patent Publication No. 2009-073324 and the JP Laid-open Patent Publication No. 2010-125898.)

It has, however, been found that since in the JP Laid-open Patent Publication No. 2009-073324 the lamp is disposed up to the top of a vehicle body front portion, the center of gravity of the automotive vehicle occupies a high position. Also, since according to the JP Laid-open Patent Publication No. 2010-125898 the lamp unit is of a structure equipped with a reflector, the size of the lamp unit becomes large particularly in a direction longitudinally of the automotive vehicle (in a forward and rearward direction) and the dimension of the fairing accommodating the lamp unit increases, resulting in deterioration of the aesthetic appearance of the vehicle body.

SUMMARY OF THE INVENTION

In view of the foregoing, the present invention has been devised to substantially eliminate the problems and inconveniences inherent in the prior art saddle-riding type automotive vehicles and is intended to provide an improved saddle-riding type automotive vehicle designed to bring the center of gravity of the vehicle body to a lower position and also to enhance the aesthetic appearance of the vehicle body.

In order to accomplish the foregoing object, the present invention provides a saddle-riding type automotive vehicle, which includes a front fairing for enclosing a front portion of a vehicle body structure and a headlamp device comprising one or more lamp units disposed within the front fairing. The lamp unit is a direct lighting type and comprises one or more light emitting portions having an LED chip mounted on a circuit board, and one or more lens portions for projecting light, emitted from the light emitting portion, in a direction forwardly of the device. The front fairing is formed to represent a streamlined shape and is bulged gradually outwardly of a vehicle widthwise direction and upwardly from a tip portion thereof to the rearward. The headlamp device is disposed proximate to a lower end of the front fairing. It is to be noted that the term "direct lighting type lamp" referred to above is intended to mean a lamp of a kind capable of emitting light from the light emitting portion to the outside directly from the lens with no reflector used.

According to the above described construction, since the front fairing is so formed as to represent a streamlined shape bulging laterally outwardly of the vehicle widthwise direction and upwardly from the tip portion thereof to the rearward, the tip portion of the front fairing coincides substantially with the lower end portion of the front fairing and this lower region becomes larger in dimension in the forward and rearward direction than that of a upper region of the front fairing. Since the headlamp device is disposed in this lower region, which is large in dimension in the forward and rearward direction, disposition is easy to accomplish and the position of the center of gravity of the vehicle body structure is lowered and, moreover, the headlamp device can be made less conspicuous. Also, since there is no need to prepare the space for installation of the headlamp device in the upper region of the front fairing, the dimension in the forward and rearward direction of the upper region of the front fairing can be reduced. Additionally, since the lamp unit makes use of the direct lighting type LED as the light emitting portion, elimination of use of any reflector is effective to suppress the dimension in the forward and rearward direction of the headlamp device and, therefore, the dimension in the forward and rearward direction of the lower region of the front fairing can also be reduced. In this way, since the front fairing and the headlamp device are compactized and the headlamp can be made less conspicuous, the aesthetic appearance of the automotive vehicle is enhanced.

In the present invention, the headlamp device referred to above is preferably disposed having been spaced downwardly relative to an upper bracket for supporting a front fork assembly. According to this construction, with the headlamp device being disposed at a low position, the center of gravity of the automotive vehicle can be defined at a low position.

In the present invention, one pair of the lamp units are preferably disposed on respective left and right sides. According to this construction, as compared with the case in which a single large lamp unit is employed or a plurality of lamp units are juxtaposed one above the other in an up and down direction (a vertical direction), the vertical dimension of the lens portion can be reduced. Accordingly, the headlamp device is rendered to be further less conspicuous and the aesthetic appearance of the automotive vehicle is further enhanced.

Where one pair of the lamp units are disposed on the respective left and right sides, it is preferred that each of the lamp units has a plurality of lens portions and a plurality of the lens portions of those lamp units on the both sides are, when viewed from front, disposed on a V-shaped line. According to this construction, since the lens portion comes to be disposed along an outer surface of the front fairing, the plurality of the lens portions can be easily disposed in terms of space without allowing the front fairing being increased in size. Also, the vertical dimension and the widthwise dimension of the headlamp device can be reduced and, therefore, the front fairing can be reduced in size, allowing the aesthetic appearance of the automotive vehicle to be enhanced.

In the present invention, a lens has an outer peripheral surface preferably receded inwardly of the front fairing structure beyond an outer surface of the front fairing. According to this construction, since the headlamp device is receded inwardly of the outer surface of the front fairing, the headlamp device becomes further less conspicuous and, therefore, the aesthetic appearance of the automotive vehicle can be further enhanced.

In the present invention, a lens preferably has an outer surface gradually inclined in a direction inwardly of the vehicle body structure towards the lower portion thereof. According to this construction, if the lens is inclined inwardly of the vehicle body structure, the incoming wind can be guided outwardly of the widthwise direction.

Where one pair of the lamp units are disposed on the respective left and right sides, the lamp unit is desirable to include a plurality of light emitting portions juxtaposed in a direction widthwise of the vehicle body structure. According to this construction, the light emitting portion for each is compactized and can be compactly accommodated within the front fairing.

Where a plurality of the light emitting portions are possessed, each of the lamp units preferably includes two lamps offset in the widthwise direction of the vehicle body structure, in which case the lens portion on an outer side of the vehicle widthwise direction is positioned rearwardly and/or above of the lens portion on an inner side of the vehicle widthwise direction. According to this construction, the lens portion can be easily disposed inwardly of the front fairing of the streamlined shape.

Where the plurality of the light emitting portions are possessed, the lens portion of the lamp unit on the inner side of the vehicle widthwise direction is preferably formed to an elliptical or oval shape. According to this construction, while the required amount of light is secured, the dimension of the lens portion in the vertical direction can be reduced. Accordingly, the dimension of the front fairing in the vertical direction is suppressed and the headlamp device becomes less conspicuous, resulting in the further enhancement of the aesthetic appearance of the automotive vehicle. Also, the lens portion can be easily disposed inwardly of the front fairing of the streamlined shape.

In the present invention, a front end portion of a gauge unit is preferably disposed rearwardly of a rear end portion of the headlamp device. While the LED lamp evolves heat in a rear portion of the lamp, according to this construction, the gauge unit is disposed rearwardly of the rear end portion of the headlamp device, and therefore, heat evolved at the rear portion of the headlamp device, particularly when the vehicle is halted, can be prevented from ascending.

In the present invention, it is preferred that the saddle-riding type automotive vehicle further include a front suspension for connecting a vehicle front wheel and the vehicle body structure and a front fender for enclosing a region above the vehicle front wheel, in which the headlamp device is disposed above the front fender and the front fender is movable relative to the headlamp device in dependence on a road surface condition; in which the headlamp device includes a lamp casing on which the lamp unit is mounted; and in which an electric power line for supplying an electric power to the circuit board extends from a region, excluding a lower end portion in the circuit board, to the outside of the light emitting portion.

According to this construction, since the LED is utilized as the light emitting portion, the light emitting portion is undersized as compared with the case, in which a bulb is used, and the headlamp device can therefore be installed at a lower position of the automotive vehicle body structure. Also, since the electric power line extends to the outside from a region excluding the lower end portion of the circuit board, that is, an upper portion or a side portion, there is no need to take into consideration the wiring space of the electric power line in the lower portion of the lamp casing and, therefore, the lamp unit including the circuit board and the lens portion can be positioned proximate to the lower portion within the lamp casing. In this way, positioning of the headlamp device at the lower position of the vehicle body structure and disposition of the lamp unit in the lower portion within the lamp casing is effective to accomplish the lowering of the position of the center of gravity of the front portion of the vehicle body structure. Also, positioning of the light emitting portion at that low position in the way as described above is possible to render the headlamp device to be less conspicuous during the non-lighting condition and, therefore, the aesthetic appearance of the automotive vehicle can be enhanced.

In the present invention, the electric power line preferably has a tip portion provided with a removable connector to a mounting portion of the circuit board, in which case the mounting portion is provided in an upper portion or a side portion of the circuit board. According to this construction, since the mounting portion is formed in an upper portion or a side portion of the circuit board, that is, the connector of the electric power line is inserted from above or laterally into the mounting portion, there is no need to prepare in a lower portion of the lamp casing the space in which the connector is selectively inserted and removed, and therefore, the lamp unit can be disposed further beneath and the positioning of the center of gravity of the vehicle front portion at a lower position can be accomplished.

In the present invention, the lens portion preferably includes a light distributing portion for distributing light from the light emitting portion and a fixing portion formed in an outer peripheral portion of the light distributing portion and fixed to the lamp casing, in which case the fixing portion is formed in a region of the outer peripheral portion of the light distributing portion excluding a region on a outer side portion in a vehicle widthwise direction. According to this construction, protrusion of the lens portion outwardly of the vehicle widthwise direction can be suppressed and the dimension of the headlamp device in the vehicle widthwise direction can also be suppressed.

In the present invention, the light distributing portion is preferably of an elliptical or oval shape having its longitudinal direction oriented in the vehicle widthwise direction and the fixing portion is formed above and/or below the light distributing portion. According to this construction, the dimension of the lens portion, including the light distributing portion and the fixing portion, as measured in the lengthwise direction thereof can be suppressed from increasing and the compactization of the headlamp device can be accomplished.

Where the fixing portion is possessed, it is preferred that the electric power line has its tip portion provided with a removable connector to a mounting portion of the circuit board and extends from a portion in the circuit board corresponding to an upper and widthwise intermediate portion towards the outside of the lens portion and that one of the fixing portions is formed above and on one side of the vehicle widthwise direction of the light distributing portion and the other of the fixing portions is formed below and on the other side of the vehicle widthwise direction of the vehicle widthwise direction. According to this construction, without the lens portion unduly increased in size, the interference between the connector and the fixing portion can be avoided.

In such case, left and right pairs or more of the lamp units may be disposed inwardly of the front fairing and the one side may be an outside of the vehicle widthwise direction and the other side may be an inner side of the vehicle widthwise direction. In general, the front fairing is so formed as to have a streamlined shape, that is, as to have the dimension in the vehicle widthwise direction and the dimension in the vertical direction that increase toward the rearward of the vehicle body structure. Accordingly, according to the above described construction, the amount of projection of the fixing portion in the vehicle widthwise direction, that is, the amount of advance of the lamp unit outwardly in the vehicle widthwise direction becomes small and, therefore, without the front fairing being increased in size, the headlamp device can be accommodated within the front fairing while the interference with an outer side portion of the headlamp device is avoided.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF PREFERRED EMBODIMENTS

Hereinafter the present invention will be described in detail in connection with a preferred embodiment thereof with reference to the accompanying drawings.

Figure 1:
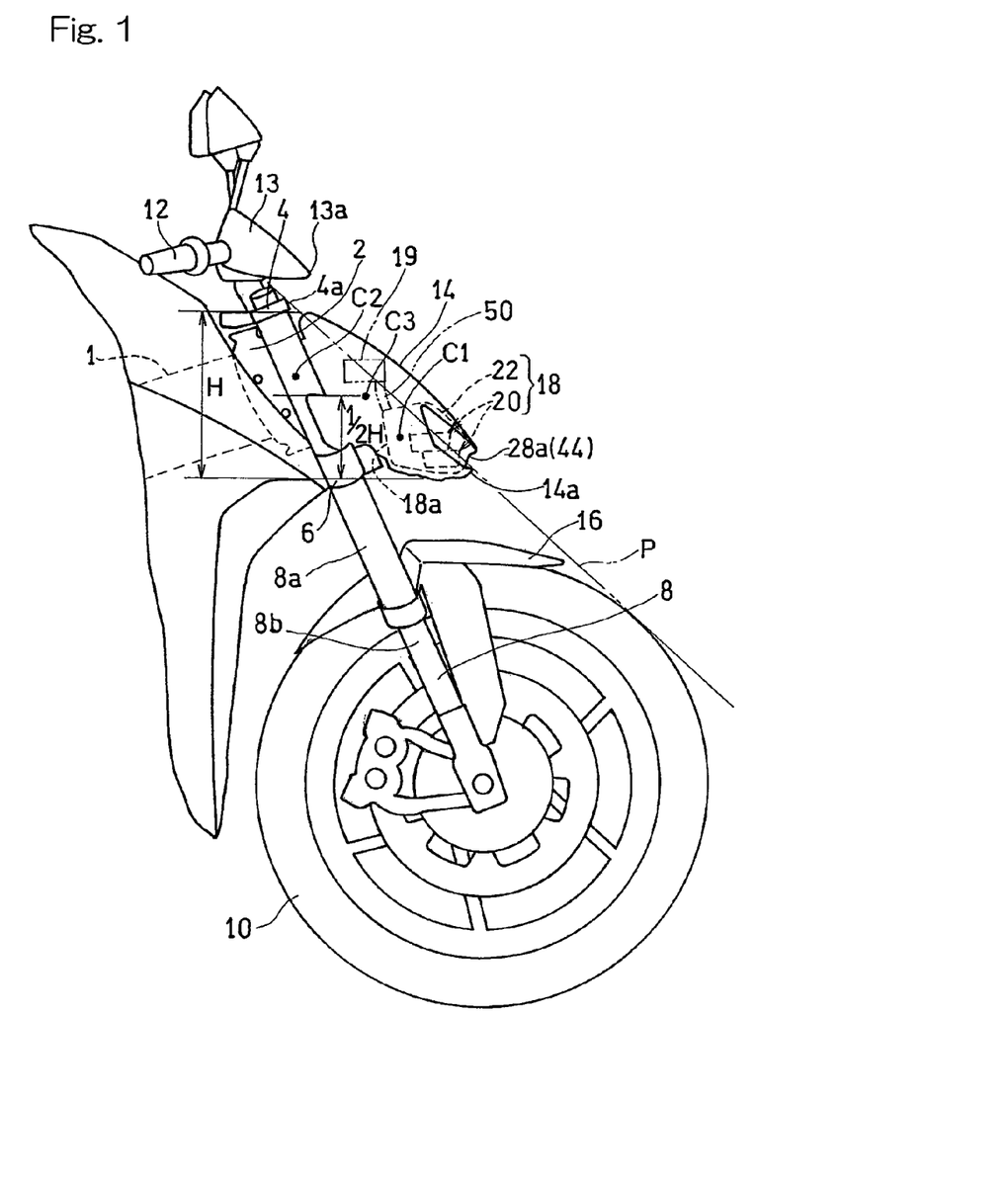
FIG. 1 is a fragmentary side view showing a front portion of an automotive vehicle designed in accordance with a preferred embodiment of the present invention.

FIG. 1 is a fragmentary side view showing a front portion of a motorcycle, which is one kind of a saddle-riding automotive vehicle equipped with a lamp device designed in accordance with a preferred embodiment of the present invention. Referring to FIG. 1, a motorcycle frame structure of the motorcycle has a main frame 1 forming a part thereof, and a front portion of the main frame 1 has a head tube 2 fitted thereto. A steering shaft (not shown) is rotatably inserted in this head tube 2 and has an upper bracket 4 and a lower bracket 6 secured thereto. A front fork assembly 8 is supported by the upper and lower brackets 4 and 6, and a steering handlebar 12 and a gauge unit 13 are fixedly mounted on the upper bracket 4 for movement together with the front fork assembly 8.

The front fork assembly 8 includes an upper tube 8a and a lower tube 8b forming a lower end portion of the front fork assembly 8, while a motorcycle front wheel 10 is rotatably supported by a lower end of the lower tube 8b. Also, a front fender 16 enclosing an upper portion of the motorcycle front wheel 10 is supported by the lower tube 8b. This lower tube 8b is connected with the upper tube 8a by a cushioning mechanism, including a coil spring and an oil damper, for telescopic movement in a direction axially thereof. Accordingly, by means of the cushioning function of the front fork assembly 8, the front fork assembly 8 forms a front suspension inclusive of the cushioning mechanism and the front fender 16 and the front wheel 10 repeatedly move together with the lower tube 8b in a direction close towards and away from a headlamp device 18 in dependence on the condition of a road surface.

A front fairing 14, which is a fairing of a kind used for enclosing a front portion of the motorcycle body structure, is supported at a front surface side of a top portion of the front fork assembly 8. This front fairing 14 is of a streamlined shape having been smoothly bulged laterally outwardly and upwardly of the motorcycle body structure from a frontmost portion 14a to the rearward. The headlamp device 18 referred to above is supported by the lower bracket 6 at a location above the front fender 16. The frontmost portion 14a of the front fairing 14 is positioned at a location that is occupied by a tip of the front fairing 14 with respect to the direction of forward travel of the motorcycle and that also lies at a point intermediate of the width of the motorcycle body structure. In the illustrated embodiment, the frontmost portion 14a is located in the vicinity of the lower bracket 6 with respect to the vertical direction of the motorcycle body structure. Also, the front fairing 14 is of a structure having its angle displaceable together with the front fork assembly 8 relative to the head tube 2.

The headlamp device 18 is disposed at a location adjacent a lower end of the front fairing 14 lying in the vicinity of the frontmost portion 14a. Specifically, while the front fairing 14 extends from a site forwardly of a portion of a lower face of the upper bracket 4, which occupies at a point intermediate of the upper bracket 4 in the widthwise direction thereof, to a site forwardly of the lower bracket 6, the head lamp device 18 is disposed at a location forwardly of the lower bracket 6, but spaced downwardly relative to the upper bracket 4. In other words, the headlamp device 18 is disposed inwardly of the front fairing 14 and in a lower region of the front fairing 14, not in an upper region thereof.

In particular, the headlamp device 18 referred to above is so disposed inwardly of the front fairing 14 that a center position C1 of the headlamp device 18 with respect to the vertical direction of the motorcycle body structure may come below a point C2 intermediate between the upper bracket 4 and the lower bracket 6 with respect to the vertical direction of the motorcycle body structure, and may come above a center position C3 of the front fairing 14 with respect to the vertical direction of the motorcycle body structure. More specifically, the headlamp device 18 in its entirety is disposed within a region of a size that is ½ or smaller than the height H of the front fairing 14. With the headlamp device 18 so disposed as hereinabove described, sunlight will hardly fall directly on the head lamp device 18 and, therefore, an undesirable concentration of sunlight within a space rearwardly of a lens, which would be caused by the lens when such sunlight falls directly on the headlamp device 18, can be avoided advantageously.

The front fairing has an inner space S defined therein, which space S is of such a size that the dimension as measured at a lower area in a forward and rearward (direction longitudinally of the automotive vehicle) is larger than that at an upper area and, also, the dimension as measured at a center portion in the forward and rearward direction is larger than that at a portion outwardly of the widthwise direction of the motorcycle body structure. As hereinabove described, the headlamp device 18 is disposed within a large space on a lower side of the inner space S and adjacent a center thereof, and a voltage converting unit 19 for supplying an electric power to the headlamp device 18 is arranged on an upper side of the inner space S. Also, on the upper side of the inner space S, other than the voltage converting unit 19, vehicle mounted appliances such as, for example, a GPS unit, an ETC unit and a vehicle antitheft device may be arranged.

The headlamp device 18 includes left and right lamp units 20 and lamp casings 22 on which the respective lamp units 20 are mounted. A half or more of each of the lamp units 20, as viewed in a projected shape thereof, is positioned rearwardly of the imaginary line P, drawn to connect between a front end 4a of the upper bracket 4 and a front edge of the vehicle front wheel 10, with respect to the direction of forward travel of the motorcycle, and a front end portion 13a of the gauge unit 13 is positioned rearwardly of a rear end portion 18a of the headlamp device 18 similarly with respect to the direction of forward travel of the motorcycle.

Figure 3:
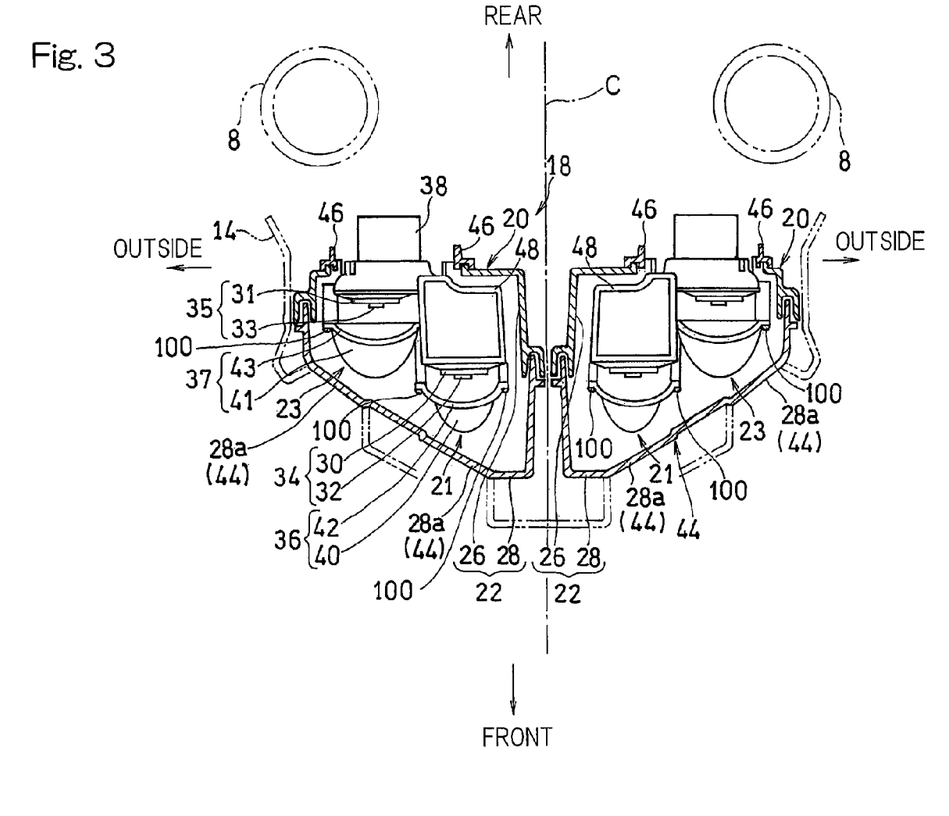
FIG. 3 is a horizontal sectional view showing the front portion of the automotive vehicle.

As shown in FIG. 3, each of the lamp units 20 includes a low beam lamp 21, disposed inwardly of the widthwise direction of the motorcycle body structure, and a high beam lamp 23 disposed outwardly of the widthwise direction of the motorcycle body structure, both of which are accommodated within the corresponding lamp casing 22 made of a resinous material. The lamp casing 22 includes a casing base 26 for supporting the both of the lamps 21 and 23 and a covering lens segment 28 positioned forwardly of each of the lamps 21 and 23. The casing base 26 is formed integrally over the left and right lamp units 20.

Both of the lamps 21 and 23 are of a so-called "direct lighting lamp" with no reflector employed and have light emitting portions 34 and 35 with LED chips 32 and 33 mounted on circuit boards 30 and 31, and lens portions 36 and 37 through which light emitted from the light emitting portions 34 and 35 is refracted and projected forwards of the device. Each of the circuit boards 30 and 31 is square in shape when viewed from front. The high beam lamp 23 has a front end portion positioned rearwardly of a front end portion of the low beam lamp 21. Since as described above, both of the lamps 21 and 23 make use of LEDs as the light emitting portions 34 and 35, the amounts of heat generated by those light emitting portions 34 and 35 are so smaller than those using bulbs, the light emitting portions 34 and 35 can be disposed in close vicinity of the lens portions 36 and 37 and the covering lens segment 28. In other words, the respective front ends of the lamps 21 and 23 are disposed in close vicinity of the covering lens segment 28.

A set of the lamps 21 and 23 in one lamp units 20 are disposed in a fashion symmetrical with a set of the lamps 21 and 23 in the other lamp units 20 with respect to the motorcycle center line (motorcycle longitudinal axis) C and spaced a distance from each other in a left and right direction (motorcycle widthwise direction). The low beam lamps 21 are used to illuminate a first region forwardly of the motorcycle body structure whereas the high beam lamps 23 are used to illuminate a second region forwardly of the first region referred to above. In the illustrated embodiment, the light emitting portions 34 and 35 in the lamps 21 and 23 are identical with each other and the lens portions 36 and 37 are each formed in a convex lens shape.

Figure 2:
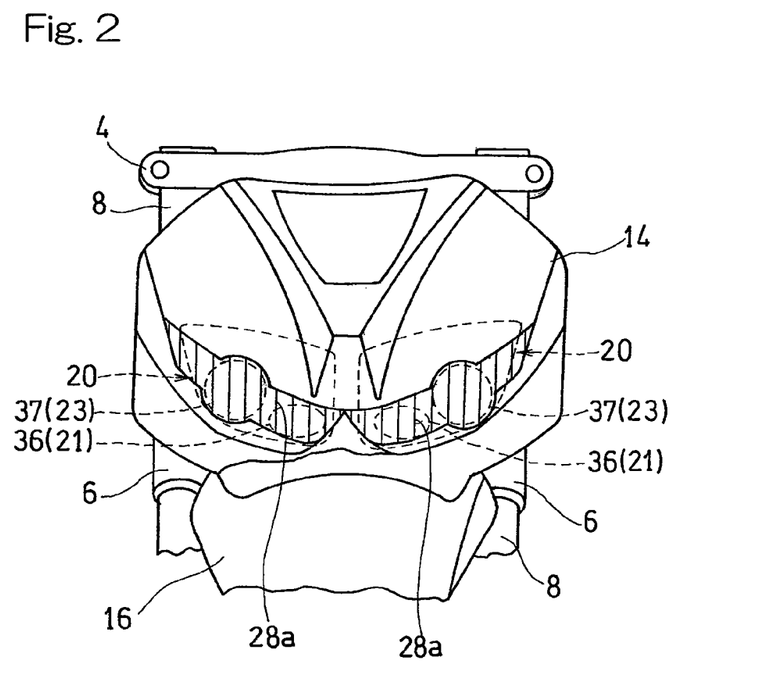
FIG. 2 is a fragmentary front elevational view showing the front portion of the automotive vehicle.

As best shown in FIG. 2, the lens portions 37 for the high beam lamps 23, which are positioned laterally outwardly of the adjacent lens portions 36 for the low beam lamps in the motorcycle widthwise direction, are positioned above the lens portion 36 for the low beam lamps 21, which are positioned laterally inwardly of the adjacent lens portions 37 in the motorcycle widthwise direction. Each of the lens portion 37 for the high beam lamp 23 is, when viewed from front, formed to a round shape whereas the lens portion 36 for the low beam lamp 21 is formed to an elongated elliptical shape. When viewed from front, the lens surface area of each of the high beam lamp 23 is so formed as to be larger than the lens surface area of the associated low beam lamp 21. In particular, each of the lens portions 37 for the high beam lamps 23 has a diameter so set as to be greater than the major axis of the associated lens portion 36 for the low beam lamp 21 and, more specifically, the diameter of each lens portion 37 for the corresponding high beam lamp 23 is chosen to be 40 mm whereas the major and minor axes of each lens portion 36 for the corresponding low beam lamp 21 are chosen to have respective lengths of 36 mm and 26 mm. The lens portion 36 of the low beam lamp 21 may be of an oval shape By so shaping as hereinabove described, the light distributing amount of each of the outer high beam lamps 23, which require a large amount of light for illuminating the second region, is secured and, at the same time, the first region near to the motorcycle body structure can be illuminated extensively by each of the low beam lamps 21. Also, within the inner space S of the front fairing 14 (as shown in FIG. 1), each of the ellipsoidal lens portions 36, which has a small dimension in the vertical direction, comes to be disposed in a forward region, whose sectional surface area perpendicular to the forward and rearward direction is small, and each of the lens portions 37, which has a large dimension in the vertical direction, comes to be disposed in a region which is rearwardly of the forward region and whose sectional surface area is relatively large. Accordingly, the lamp units 20 can be disposed compactly. It is to be noted that respective portions of the low beam and high beam lamps 21 and 23 may be overlapped one above the other in the vertical direction.

As shown in FIG. 3, each of the lamp units 20 also has a heat sink 38. This heat sink 38 is used to dissipate heat evolved in the associated circuit boards 30 and 31, which forms a part of the corresponding light emitting portion 34 or 35. In the illustrated embodiment, the heat sink 38 is formed from an aluminum die cast colored in black. Thus, since in each of the direct lighting type lamp units 20, a rear side of the lens is treated as a non-mirror surface and, specifically, colored in black, it is possible to prevent the external light from being reflected at the rear side during the non-illuminating time and an unique appearance can be enhanced as the lamp unit 20 becomes less conspicuous. In the illustrated embodiment, each of the heat sinks 38 is colored in black, but this means is not necessarily limited provided that a portion of each of the lens on the rear side is made non-mirror surface.

Each of the lamps 21 and 23 is so structured as to have its own optical axis that is adjustable by means of an optical axis manipulating unit (not shown) disposed outside the front fairing 14. Specifically, a connecting bridge (not shown) connecting the lamps 21 and 23 integrally is supported by the casing base 26 for adjustment in posture relative to the casing base 26. Accordingly, the lamps 21 and 23, which are integrated together, are fitted for adjustment in posture relative to the front fork assembly 8 and the front fairing 14. As hereinabove described, with the headlamp device 18 disposed in a region below the front fairing 14, the optical adjustment of each of the lamps 21 and 23 can be performed easily.

Each of the lens portions 36 or 37 includes a light distributing area 40 and 41 for refracting and then distributing light emitted from the corresponding light emitting portion 34 and 35, and a flanged area 42 and 43 formed in an outer peripheral portion of the corresponding light distributing area 40 and 41. Since in the direct lighting type lamp unit 20 the amount of heat generated from the respective light emitting portion 34 and 35 is small, the associated lens portion 36 and 37 can be formed from a transparent resin and, accordingly, the light distributing areas 40 and 41 and the flanged areas 42 and 43 can be formed integrally with each other.

In the headlamp device 18 as shown in FIG. 3, the light distributing areas 40 and 41 of the lens portions 36 and 37 in each of the lamp units 20 function as an inner lens having a refracting function, and a lens region 28*a*, positioned forwardly of the light distributing areas 40 and 41 and exposed outwardly through the front fairing 14, in the covering lens portion 28 of the lamp casing 22 functions as an outer lens having no refracting function. Those light distributing areas 40 and 41 and the lens region 28*a* cooperate with each other to define a lens 44 of the headlamp device 18. The light distributing areas 40 and 41 of each of the lamp units 20 are, when viewed from front, disposed on a V-shaped line and, correspondingly, the respective lens regions 28*a* and 28*a* of the lamp units 20 and 20 are, when viewed from front, formed so as to depict a V shape as shown in FIG. 2.

In this instance, the elliptical light distributing area 40 may be so disposed in a manner with its major axis inclined laterally outwardly and upwardly, or respective portions of the light distributing areas 40 and 41 may overlap one above the other with respect to the vertical direction. As shown in FIG. 1, the lens region 28*a* has an outer peripheral surface receded inwardly from an outer surface of the front fairing 14. The outer surface of the lens region 28*a* does not stand vertical, but is gradually inclined in a direction nearing the motorcycle center line C (FIG. 3), that is, in a direction inwardly of the motorcycle body structure, toward the lower portion thereof.

Figure 4:
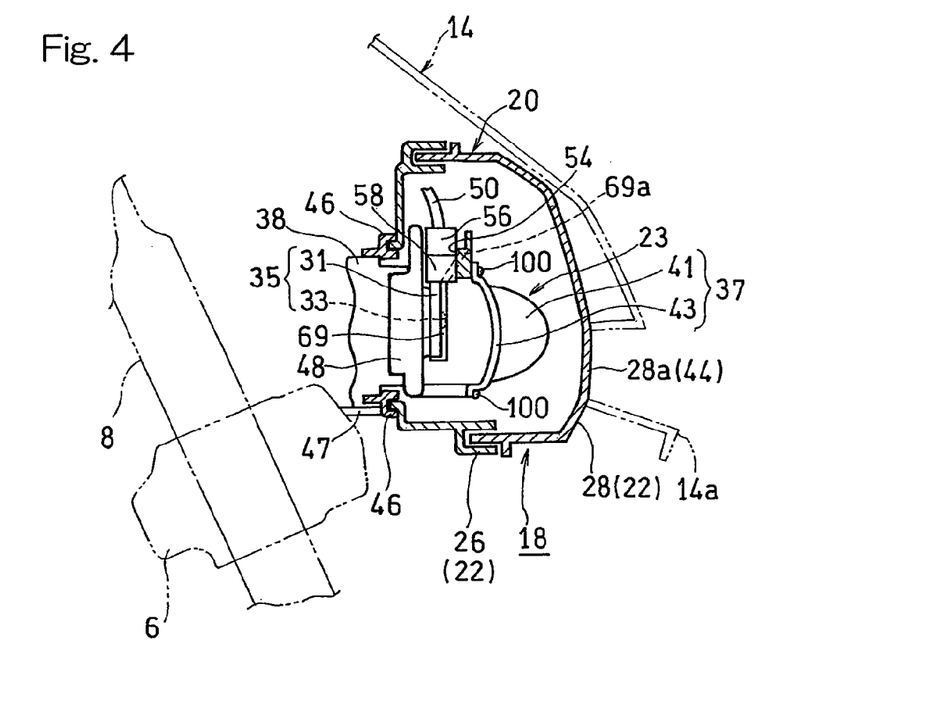
FIG. 4 is a longitudinal sectional view showing the front portion of the automotive vehicle.

FIG. 4 illustrates a longitudinal sectional view of the high beam lamp 23. As shown therein, the lamp unit 20 of the headlamp device 18 is disposed proximate to the lower bracket 6 and a fitting site 46 thereof is supported by the lower bracket 6 through a support member 47. Positioning of the headlamp device 18 at a location proximate to the lower bracket 6 makes it possible to use the support member 47 of a low rigidity and also to compactize the support member 47.

As shown in FIG. 3, the lamp unit 20 has a frame member 48 formed integrally with the heat sink 38 and, through this frame member 48, the lamp unit 20 is supported by the casing base 26 by means of a fastening member (not shown) such as, for example, a bolt and nut.

As shown in FIG. 4, the frame member 48 has an engagement member 69 mounted therein and, by means of this engagement member 69, the light emitting portion 35 is urged towards and fixed to the frame member 48. Each of the engagement members 69 is in the form of an elongated spring member extending in the vertical direction and, as clearly shown therein, an upper end portion 69*a* is fixed to the frame member 48.

Figure 5:
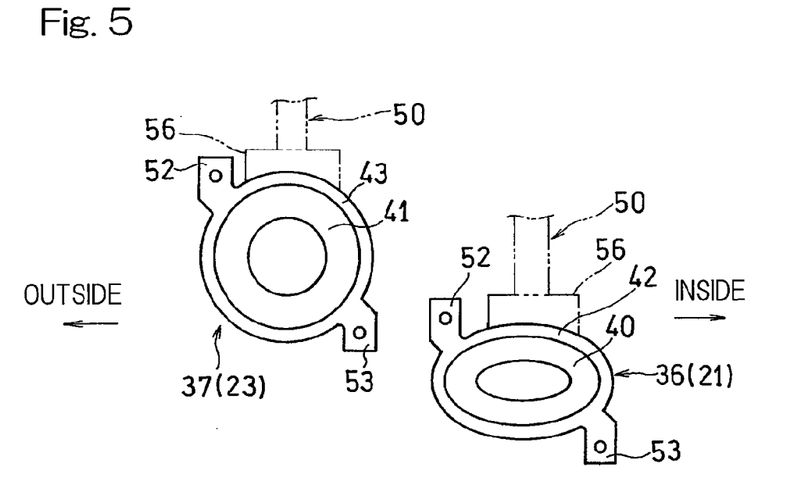
FIG. 5 is a fragmentary front elevational view showing a lens portion of a lamp unit of the automotive vehicle.

As shown in FIG. 5, each of the lens portions 36 and 37 of the lamp unit 20 has respective fixing portions 52 and 53 that protrude from the flanged portions 42 and 43 and, as shown in FIG. 3, those fixing portions 52 and 53 are connected with the frame member 48 by means of bolts 100. By so doing, the heat sink 38, the frame member 48, the light emitting portions 34 and 35 and the lens portions 36 and 37 are supported by the lamp casing 22.

As shown in FIG. 5, the one fixing portions 52 of the lens portions 36 and 37 are formed above and on one side, in particular an outer side, of the vehicle widthwise direction of the associated flanged portion 42 and 43, while the other fixing portions 53 of the lens portions 36 and 37 are formed below and on the other side, in particular on an inner side, of the vehicle widthwise direction of the associated flanged portion 42 and 43. More specifically, the fixing portions 52 of the lens portions 36 and 37 extend upwardly from an outer side area of an upper portion of the associated flanged portion 42 and 43 whereas the fixing portions 53 of the lens portions 36 and 37 extend downwardly from an inner side area of a lower portion of the associated flanged portion 42 and 43. The fixing portions 52 and 53 may however be formed in regions of the outer peripheral portions of the light distributing portions 40 and 41 other than outer side portions in the motorcycle widthwise direction and the positions and the number of those fixing portions 52 and 53 are not necessarily limited to those shown and described. Also, the use of the flanged portions 42 and 43 may be dispensed with, in which case the fixing portions 52 and 53 extend directly from the light distributing portions 40 and 41.

As shown in FIG. 4, the frame members 48 have openings 54 defined therein at locations above the circuit boards 31, respectively, so as to open upwardly and, from above into these openings 54, the light distributing portion 35 and an electric power line or wire 50 are inserted, respectively. The electric power line 50 is a cable for supplying an electric power therethrough to the circuit board 31 and has its tip portion provided with a connector 56.

A mounting portion 58 in the form of a socket is formed in an upper portion of the square shaped circuit board 31, which portion has a horizontally extending upper edge, and the connector 56 referred to above is removably connected with such mounting portion 58. In other words, the electric power line 50 extends above the lens portion 36 in the circuit board 31 and upwardly from a widthwise intermediate portion of the circuit board 31. Accordingly, with the electric power line extending upwardly, in the event that water ingresses into the interior of the front fairing 14, not only can the electric power line 50 be prevented from being wetted with water, but also heat of the electric power line 50 can be prevented from reaching the lens portion 37 and/or the circuit board 31. Also, by positioning the electric power line 50 upwardly, the length of the wiring between the circuit board 31 and the voltage converting unit 19 (shown in FIG. 1) can be reduced. Yet, even when the optical axis manipulating unit (not shown) is disposed beneath the lamp unit 20 so as to easily manipulate it, interference with the electric power line 50 can be avoided.

It is, however, to be noted that the direction in which the electric power line 50 extends may not be necessarily upwards, provided that the electric power line 50 be extends outwardly from the region excluding the lower end portion of the circuit board 31 and may extend in, for example, a lateral direction. In other words, the opening 54, through which the circuit board 31 is selectively inserted and removed, is preferably formed at a location above the circuit board 31 or laterally of the circuit board 31. It is, however, to be noted that where the lamps 21 and 23 are juxtaposed on left and right sides as shown in connection with the illustrated embodiment, if the electric power line 50 is drawn to extend from the lateral location, there is the possibility that it may interfere with other lamps and, therefore, the electric power line 50 is preferably drawn to extend upwardly.

Although with particular reference to FIG. 4, the opening 54 and the mounting portion 58, both for the high beam lamp 23, have been described, even the low beam lamp 21 is provided with the opening 54 and the mounting portion 58, both being of the structure similar to that described above. Although in the embodiment now under discussion, the power lines 50 for the lamps 21 and 23 have been described as extending in a direction other than a downward direction, specifically in an upward direction, the electric power line 50 for the lower lamp, that is, the low beam lamp 21 may extend in the direction other than the downward direction and the electric power line 50 for the upper lamp, that is, the high beam lamp 23 may extend downwards. It is, however, to be noted that if the electric power lines 50 for those lamps 21 and 23 are allowed to extend from the same direction, the circuit board, the mounting portion and others can be made common for the lamps 21 and 23.

In the construction described above, since as best shown in FIG. 3 the lamp unit 20 is a direct lighting type lamp of a kind utilizing the LED, the elimination of the reflector makes it possible to suppress the dimension of the headlamp device 18 in the forward and rearward direction. Furthermore, the light emitting portions 34 and 35 will not be excessively heated as compared with those utilizing bulbs. Therefore, the distances between the light emitting portions 34 and 35 and the lens portions 36 and 37 and the lens covering 28 can be reduced. As a result, the dimension of the lower region of the front fairing 14 in the forward and rearward direction can also be reduced. Since as described above the front fairing 14 and the headlamp device 18 are compactized and the headlamp device 18 is made less conspicuous, the aesthetic appearance of the motorcycle is enhanced.

In addition, when the dimension of the headlamp device 18 as measured in the forward and rearward direction is reduced, the headlamp device 18 are, as shown in FIG. 1, disposed in the vicinity of the front fork assembly 8 that rotates together with the handlebar 12, and, therefore, with the reduction in weight of the headlamp device 18 the management of the handlebar 12 become easy, resulting in increasing the maneuverability.

Since the lamp units 20 shown in FIG. 3 make use of LEDs as the light emitting portions 34 and 35, the light emitting portions 34 and 35 do not evolve heat and, therefore, the lens portions 36 and 37 can be molded from a material having a low heat resistance such as a transparent resinous material.

Also, as shown in FIG. 3, the LEDs are utilized as the light emitting portions 34 and 35, the light emitting portions 34 and 35 are compactized as compared with those utilizing bulbs and, therefore, the headlamp device 18 can be positioned at a low position of the motorcycle body structure. In addition, since as shown in FIG. 4 the electric power lines 50 extend upwardly from the circuit boards 30 and 31, there is no need to take into consideration any wiring space for the electric power lines 50 in a lower portion within the lamp casing 22 and, therefore, the lamp units 20 including the circuit boards 30 and 31 and the lens portions 36 and 37 can be disposed at a location proximate to the lower portion within the lamp casing 22.

As hereinabove described, by disposing the headlamp device 18 at the low location of the motorcycle body structure and disposing the lamp casings 22 of the lamp units 20 at the lower portion within the lamp casing 22, the center of gravity of the front portion of the motorcycle can be set at a low position. Also, by setting the light emitting portions 34 and 35 at the low position, the headlamp device 18 disposed inwardly of the front fairing 14 will become less conspicuous during the non-illuminating condition and, therefore, the aesthetic appearance of the motorcycle can be further enhanced.

Since the mounting portions 58 are formed on upper portions of the circuit board 30 and 31 and the connectors 56 for the electric power lines 50 are inserted into the mounting portions 58 of the lamps 21 and 23 from above, spaces at which the connectors 56 are removed, need not be left in the lower portion of the lamp casing 22, and the lamps 21 and 23 forming respective parts of the lamp unit 20 can be disposed at a further lower area. As a result, the center of gravity of the motorcycle front portion can further be lowered in position. In addition, as compared with the case in which the connector 56 for the electric power 50 is inserted laterally into the light emitting portions 34 and 35 of the lamps 21 and 23, the dimension of the lamp casing 22 in the motorcycle widthwise direction, that is, the dimension of the headlamp device 18 in the motorcycle widthwise direction can be suppressed.

Since as shown in FIG. 3, the use of any reflector is dispensed with, the lamp nit 20 is correspondingly undersized and the lamp unit 20 can therefore be disposed in the lower portion of the lamp casing 22. As a result, the center of gravity of the motorcycle front portion can further be lowered in position.

Since as shown in FIG. 5, the fixing portions 52 and 53 are formed in that region in the lens portions 36 and 37, excluding outer portions of the flanged portions 42 and 43 as measured in the motorcycle widthwise direction, an undesirable projection of the lens portions 36 and 37 in a direction outwardly of the motorcycle widthwise direction can be suppressed and the dimension of the headlamp device 18 as measured in the motorcycle widthwise direction can therefore be suppressed. Accordingly, with no need to increase the size of the front fairing 14, the headlamp device 18 can be accommodated within the front fairing 14 while avoiding an undesirable interference with an outer portion of the headlamp device 18.

As described above the electric power lines 50 extend upwardly from portions in the circuit boards 30 and 31 (shown in FIG. 3) corresponding to upper portions and that portion intermediate of the lens portions 36 and 37 in the motorcycle widthwise direction. The fixing portions 52 of the lens portions 36 and 37 are formed in the upper and outer portions of the associated flanged portions 42 and 43, whereas the fixing portions 53 of the lens portions 36 and 37 are formed in the lower and inner portions of the associated flanged portions 42 and 43. Accordingly, the undesirable interference between the connector 56 of the electric power line 50 and the fixing portions 52 and 53 can be avoided without increasing the lens portions 36 and 37 in size.

Since as shown in FIG. 5, the light distributing portion 40 of the lens portion 36 for the low beam lamp 21 is of the oval shape with its lengthwise direction oriented in the motorcycle widthwise direction and the fixing portions 52 and 53 thereof is formed in the upper and lower portion of the flanged portion 42, forming an outer peripherally portion of the light distributing portion 40, the headlamp device 18 can be compactized while suppressing an undesirable increase of the dimension of the lens portion 36 as measured in the lengthwise direction thereof.

Yet, since as shown in FIG. 4, the front fairing 14 is so formed as to represent the streamlined shape, the lower region, rather than the upper region, of the front fairing 14 comes to have an increased dimension in the forward and rearward direction. Since the headlamp device 18 is disposed in that lower region, which is large in the dimension in the forward and rearward direction, positioning thereof is easy and the position of the center of gravity of the motorcycle can be lowered with the headlamp device 18 being less conspicuous. In addition, since there is no need to provide the space for installation of the headlamp device 18 in the upper region of the front fairing 14, the dimension in the forward and rearward direction of the upper region of the front fairing 14 can be reduced.

Since as shown in FIG. 1, the headlamp device 18 is disposed having been spaced a distance downwardly relative to the upper bracket 4 supporting the front fork assembly 8, the position of the center of gravity of the motorcycle can be lowered by disposing the headlamp device 18 at a low position.

Since as shown in FIG. 2, the lamp unit 20 is disposed in a pair on the left and right sides, as compared with the case in which a single large lamp unit is employed or a plurality of lamp units are disposed one above the other in the vertical direction, the vertical dimension of the light distributing portions 40 and 41 can be reduced. Accordingly, the headlamp device 18 becomes less conspicuous and the aesthetic appearance of the motorcycle can be further enhanced.

In addition, since the light distributing portions 40 and 41, when viewed from front, are disposed to occupy their positions lying on the V-shaped line, the light distributing portions 40 and 41 naturally come to be disposed along the outer surface of the front fairing 14 and, hence, the light distributing portions 40 and 41 can be easily disposed without increasing the size of the front fairing 14. As a result thereof, the vertical dimension and the dimension in the motorcycle widthwise direction of the headlamp device 18 are reduced and the front fairing 14, which accommodates the headlamp device 18, is also reduced in size, resulting in the enhancement of the aesthetic appearance of the motorcycle.

Since as shown in FIG. 1, the outer peripheral surface of the lens 44 is receded inwardly of the motorcycle body structure beyond the outer surface of the front fairing 14, the headlamp device 18 will become further less conspicuous and the aesthetic appearance of the motorcycle is therefore enhanced further.

Yet, since the outer surface of the lens 44 is gradually inclined inwardly of the motorcycle toward the downward direction, the lens 44 can be utilized as a wind guiding portion for guiding the incoming wind in a direction outwardly of the motorcycle widthwise direction. The incoming wind flowing along the outer surface of the lens 44 is so guided as to be prevented from flowing upwardly from the lens 44 but to flow outwardly of the motorcycle widthwise direction at a location below the handlebar 12 and, therefore, the incoming wind flowing towards the handlebar 12 can be reduced.

Since as shown in FIG. 3, the lamp unit 20 includes the two light distributing portions 34 and 35 that are juxtaposed in the motorcycle widthwise direction, the light distributing portions 34 and 35 for each become compact and can be compactly accommodated within the front fairing 14.

Also, since the lamp unit 20 includes the two lamps 21 and 23 that are offset in the motorcycle widthwise direction and the lens portion 37 of the lamp 23 on the outer side of the motorcycle widthwise direction is positioned rearwardly and upwardly of the lens 36 of the lamp 21 on the inner side of the motorcycle widthwise direction, the lens portions 36 and 37 are easy to be disposed inwardly of the front fairing 14 of the streamlined shape.

Since as shown in FIG. 2, the light distributing portion 40 of the low beam lamp 21 of the lamp unit 20, which is on the inner side of the motorcycle widthwise direction, is formed to have the oval shape and the light distributing portion 41 of the high beam lamp 23 on the outer side is formed to the large round shape, the vertical direction dimensions of the light distributing portions 40 and 41 can be reduced while securing the required of amount of light. Accordingly, the dimensions of the light distributing portions 40 and 41 as measured in the vertical direction are suppressed and, at the same time, the headlamp device 18 becomes less conspicuous, resulting in the further enhancement of the aesthetic appearance of the motorcycle.

As shown in FIG. 1, the front end portion 13a of the gauge unit 13 is disposed rearwardly of the rear end portion 18a of the headlamp device 18, and therefore, heat evolved in a rear portion of the headlamp device 18, particularly when the motorcycle is halted, can be prevented from ascending towards the gauge unit 13 can be avoided.

In addition, at a position above and intermediate between the two lamp units 20 and 20 of the headlamp device 18 in the motorcycle widthwise direction, an air intake port for introducing an air for ram air may be provided. In this case, an air passage extending from the air intake port in a direction rearwardly of the motorcycle body structure will comes to be disposed in an upper side portion in the inner space S of the front fairing 14 shown in FIG. 1, but since the headlamp device 18 is disposed in a lower side portion of the inner space S, the possible interference between the headlamp device 18 and the air passage can be avoided.

Although in describing the foregoing embodiment, the use of two lamps on each of the left and right side, totaling to four lamps, has been shown and described, arrangement may be made to use one high beam lamp on one of the left and right side and one low beam lamp on the other of the left and right side. Also, although in describing the foregoing embodiment, the lamps have been shown and described as to be angularly adjustable together with the front fork assembly, it may suffice that a headlamp device equipped with an LED lamp is disposed within the streamlined fairing and arrangement may be made to fix the headlamp device to the head tube without being adjustable in angle together with the front fork assembly.

Figure 6:
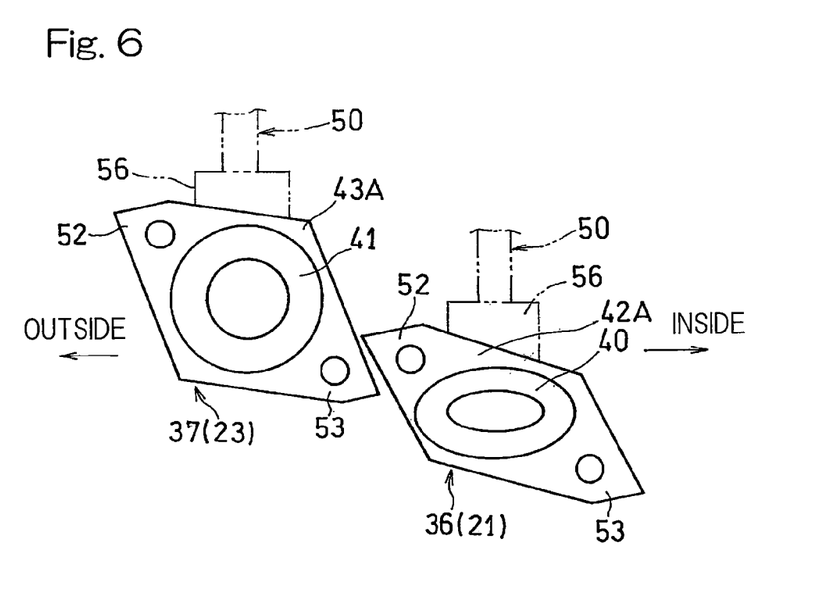
FIG. 6 is a front elevational view showing a first modified lens portion of the lamp unit.

FIG. 6 illustrates a first modification made to the lens portions 36 and 37, and only the lens portions 36 and 37 employed in the right headlamp devices are shown. As shown therein, the lens portions 36 and 37 have their flanged portions 42A and 43A so formed as to have a substantially parallelogrammical shape, and respective corners of the flanged portions 42A and 43A, which are opposed to each other, are formed with respective fixing portions 52 and 53. The fixing portions 52 protrude slantwise outwardly upwardly from an outer side upper portion of the lens portions 36 and 37 and the fixing portions 53 protrude slantwise inwardly downwardly from an inner side lower portion of the lens portions 36 and 37. In this first modification, not only can effects similar to those afforded by the previously described embodiment, but also the lens portions 36 and 37 can have a simplified structure.

Figure 7:
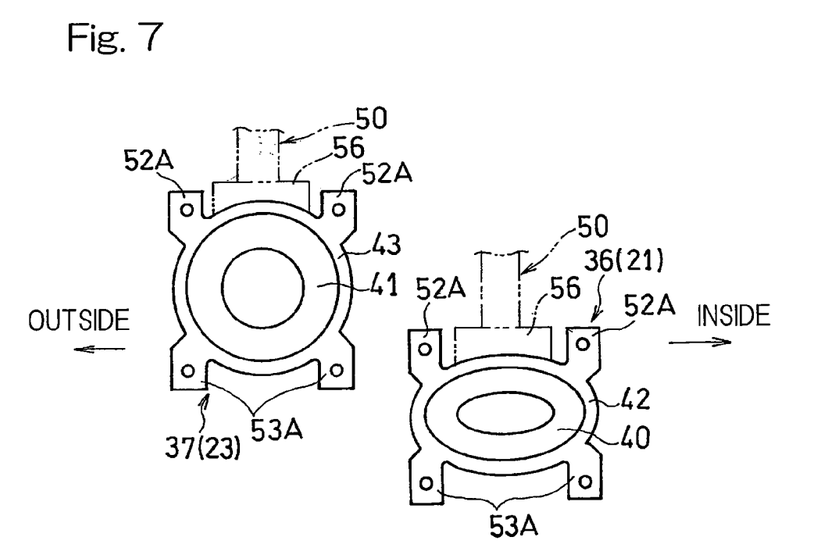
FIG. 7 is a front elevational view showing a second modified lens portion of the lamp unit.

FIG. 7 illustrates a second modification made to the lens portions 36 and 37, and only the lens portions 36 and 37 employed in the right headlamp device are shown. As shown therein, fixing portions 52A and 53A are each formed in four in number in the lens portions 36 and 37. In other words, four fixing portions 52A and 53A are formed in each of the lens portions 36 and 37. More specifically, the two fixing portions 52A and 52A protrude upwardly from an upper outer side portion and an upper inner side portion of each of the lens portions 36 and 37 while the remaining two fixing portions 53A and 53A protrude downwardly from a lower inner side portion and a lower outer side portion. In this second modification, not only can effects similar to those afforded by the previously described embodiment, but each of the lens portions 36 and 37 can be firmly supported by the four fixing portions 52A and 53A.

Figure 8:
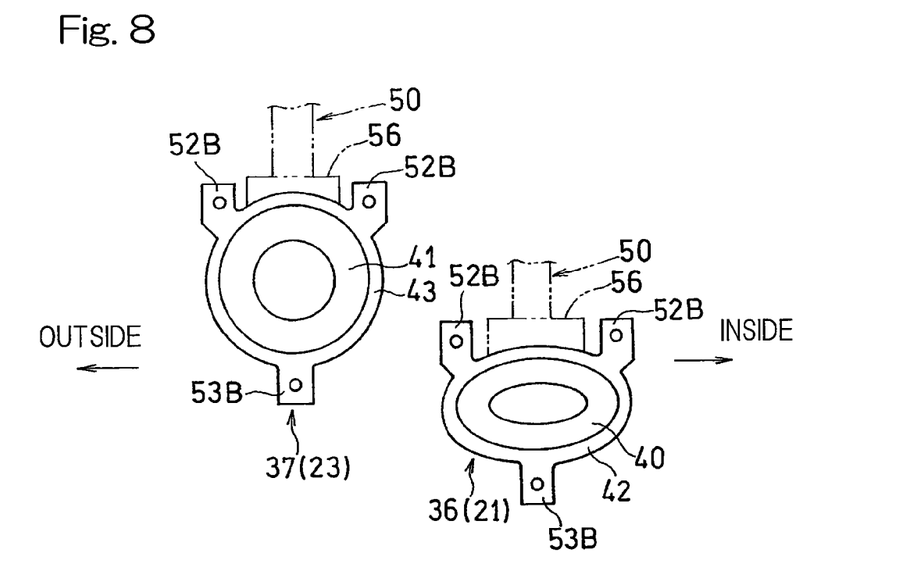
FIG. 8 is a front elevational view showing a third modified lens portion of the lamp unit.

FIG. 8 illustrates a third modification made to the lens portions 36 and 37, and only the lens portions 36 and 37 used in the right headlamp device are shown. As shown therein, fixing portions 52B and 53B are formed in three in number in each of the lens portions 36 and 37. More specifically, the two the fixing portions 52B and 52B protrude upwardly from an upper outer side portion and an upper inner side portion of each of the lens portion 36 and 37 and the remaining fixing portion 53B protrudes downwardly from a portion intermediate of the vehicle widthwise direction in a lower portion. In this third modification, not only can effects similar to those afforded by the previously described embodiment, but since the lens portions 36 and 37 are asymmetrical with respect to vertical, it is possible to avoid a possible erroneous combination during the assemblage.

Figure 9:
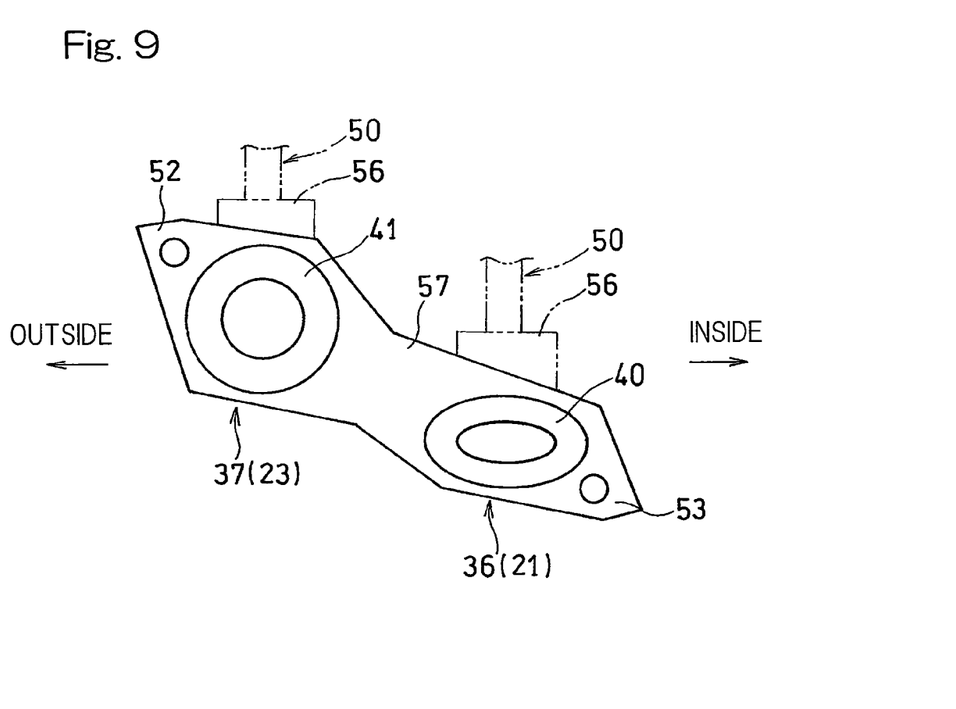
FIG. 9 is a front elevational view showing a fourth modified lens portion of the lamp unit.

FIG. 9 illustrates a fourth modification made to the lens portions 36 and 37, and only the lens portions 36 and 37 used in the right headlamp device are shown. In this fourth modification, as shown therein, the lens portion 36 for the low beam lamp 21 and the lens portion 37 for the high beam lamp 23 are formed integrally with each other, and two fixing portions 52 and 53 are formed in a common flanged portion 57. One fixing portion 52 protrudes slantwise outwardly upwardly from an outside upper portion of the flanged portion 39 and the other fixing portion 53 protrudes slantwise inwardly downwardly from an inside lower portion of the flanged portion 39. In this fourth modification, not only can effects similar to those afforded by the previously described embodiment, but the number of component parts can be reduced.

It is sufficient that the fixing portions 52 and 53 may be formed in the region of the outer peripheral portions of the light distributing portions 40 and 41 or the flanged portions 42 and 43 excluding the outer side portion in the vehicle widthwise direction and may be of various shapes other than those shown and described in connection with the foregoing embodiment and the first to fourth modifications described herein above. Also, by way of example, the lens portions 36 and 37 in the first to fourth modifications can be combined. For example, the first modification shown in and described with particular reference to FIG. 6 is employed in the lens portion 36 whereas the third modification shown in and described with particular reference to FIG. 8 is employed in the lens portion 37.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. By way of example, the flanged portions 42 and 43 employed in the previously described embodiment may be treated with a surface texturing process so that joints between the lens portions 36 and 37 and the lamp casing 22 can be concealed from sight. Also, the lamp unit 20 may be employed in one or three or more in number, and, correspondingly, the lamps 21 and 23, having the light emitting portions 34 and 35, built in each of the lamp units 20 may also be employed in one or three or more in number. In addition, the present invention is applicable to a saddle-riding type automotive vehicle of a type equipped with a front fork assembly and is equally applicable to a tricycle, a four-wheel vehicle, an electric vehicle and a hybrid car. Yet, the present invention is applicable to an automotive vehicle equipped with a fairing of a so-called full cowl type.

Accordingly, such changes and modifications are, unless they depart from the scope of the present invention as delivered from the claims annexed hereto, to be construed as included therein.

The embodiment of the present invention hereinabove described has been shown and described as including, as component elements, the direct lighting type lamp unit, the streamlined front fairing and the headlamp device disposed adjacent the lower end of the front fairing, but the following modes, which do not require those component elements, are available.

[Mode 1]

A saddle-riding type automotive vehicle, which includes front suspension for connecting a vehicle front wheel and a vehicle body structure, a front fender for enclosing a region above the vehicle front wheel, and a headlamp device disposed above the front fender, the front fender being movable relative to the headlamp device in dependence on a road surface condition; and in which the headlamp device includes a lamp casing and one or more lamp unit is mounted on the lamp casing;

in which the lamp unit includes one or more light emitting portions having an LED chip mounted on a circuit board and one or more lens portions for refracting and projecting light from the light emitting portion in a direction forwardly; and in which an electric power line for supplying an electric power to the circuit board extends from a region, excluding a lower end portion in the circuit board, to the outside of the light emitting portion.

[Mode 2]

The saddle-riding type automotive vehicle as described in the mode 1 above, in which the electric power line has its tip portion provided with a removable connector to a mounting portion of the circuit board; and the mounting portion is provided on an upper portion or a side portion of the circuit board.

[Mode 3]

The saddle-riding type automotive vehicle as described in the mode 1 above, in which the lamp unit makes use of a direct lighting type lamp.

[Mode 4]

The saddle-riding type automotive vehicle as described in the mode 1 above, in which the lens portion includes a light distributing portion for distributing light from the light emitting portion and a fixing portion formed in an outer peripheral portion of the light distributing portion and adapted to be fixed to the lamp casing.

[Mode 5]

The saddle-riding type automotive vehicle as described in the mode 4 above, in which the electric power line has its tip portion provided with a removable connector to a mounting portion of the circuit board and extends from a portion in the circuit board corresponding to an upper and widthwise intermediate portion towards the outside of the lens portion; and in which the fixing portion is formed above the light distributing portion and on one side of the vehicle widthwise direction and, also, below the light distributing portion and on the other side of the vehicle widthwise direction.

[Mode 6]

The saddle-riding type automotive vehicle as described in the mode 5 above, in which left and right one or more pairs of lamp units are disposed within the front fairing; and in which the one side is an outer side of the vehicle widthwise direction and the other side is an inner side of the vehicle widthwise direction.

[Mode 7]

The saddle-riding type automotive vehicle as described in the mode 4 above, in which the light distributing portion is of an elliptical or oval shape having a longitudinal direction oriented in the vehicle widthwise direction; and in which the fixing portion is formed above and/or below the light distributing portion.

REFERENCE NUMERALS

4 Upper bracket
8 Front fork assembly (Front suspension)

10 Front wheel
13 Gauge unit
14 Front fairing
14a Frontmost portion
16 Front fender
18 Headlamp device
20 Lamp unit
21 Low beam lamp
22 Lamp casing
23 High beam lamp
30, 31 Circuit board
32, 33 LED chip
34, 35 Light emitting portion
36, 37 Lens portion
40, 41 Light distributing portion
50 Electric power line
52, 52A, 52B, 53, 53A, 53B Fixing portion
56 Connector
58 Mounting portion

What is claimed is:

1. A saddle-riding type automotive vehicle, which comprises:
    a front fairing for enclosing a front portion of a vehicle body structure;
    a headlamp device disposed within the front fairing and comprising one or more lamp units;
    the lamp unit being a direct lighting type and comprising one or more light emitting portions having an LED chip mounted on a circuit board, and one or more lens portions for projecting light, emitted from the light emitting portion, in a direction forwardly of the device, the lens portion receiving the light directly from the light emitting portion;
    the front fairing being formed to represent a streamlined shape and bulged gradually outwardly of a vehicle widthwise direction and upwardly from a tip portion thereof to the rearward; and
    the headlamp device being disposed proximate to a lower end of the front fairing, in which one pair of the lamp units are disposed on respective left and right sides of the front fairing,
    wherein each of the lamp units includes a plurality of light emitting portions juxtaposed in a direction widthwise of the vehicle body structure, and the lens portion of the lamp units on the inner side of the vehicle widthwise direction is formed to an elliptical or oval shape having its longitudinal direction oriented in the vehicle widthwise direction.

2. The saddle-riding type automotive vehicle as claimed in claim 1, in which the headlamp device is disposed having been spaced downwardly relative to an upper bracket for supporting a front fork assembly.

3. The saddle-riding type automotive vehicle as claimed in claim 1, in which each of the lamp units has a plurality of lens portions and the plurality of the lens portions of those lamp units on the both sides are, when viewed from front, disposed on a V-shaped line.

4. The saddle-riding type automotive vehicle as claimed in claim 1, in which a lens has an outer peripheral surface receded inwardly of the front fairing structure beyond an outer surface of the front fairing.

5. The saddle-riding type automotive vehicle as claimed in claim 1, in which a lens has an outer surface gradually inclined in a direction inwardly of the vehicle body structure towards a lower portion of the lens.

6. The saddle-riding type automotive vehicle as claimed in claim 1, in which each of the lamp units includes two lamps offset in a direction widthwise of the vehicle body structure and the lens portion on an outer side of the vehicle widthwise direction is positioned rearwardly of the lens portion on an inner side of the vehicle widthwise direction.

7. The saddle-riding type automotive vehicle as claimed in claim 1, in which the lens portion of the lamp units on the outer side of the vehicle widthwise direction is positioned above the lens portion on the inner side of the vehicle widthwise direction.

8. The saddle-riding type automotive vehicle as claimed in claim 1, in which a front end portion of a gauge unit is disposed rearwardly of a rear end portion of the headlamp device.

9. The saddle-riding type automotive vehicle as claimed in claim 1, further comprising:
    a front suspension for connecting a vehicle front wheel and the vehicle body structure; and
    a front fender for enclosing a region above the vehicle front wheel,
    in which the headlamp device is disposed above the front fender and the front fender is movable relative to the headlamp device in dependence on a road surface condition;
    in which the headlamp device includes a lamp casing on which the lamp unit is mounted; and
    in which an electric power line for supplying an electric power to the circuit board extends from a region, excluding a lower end portion in the circuit board, to the outside of the light emitting portion.

10. The saddle-riding type automotive vehicle as claimed in claim 9, in which the electric power line has a tip portion provided with a removable connector to a mounting portion of the circuit board, and
    in which the mounting portion is provided in an upper portion or a side portion of the circuit board.

11. The saddle-riding type automotive vehicle as claimed in claim 9, in which the lens portion includes a light distributing portion for distributing light from the light emitting portion and a fixing portion formed in an outer peripheral portion of the light distributing portion and fixed to the lamp casing;
    in which the fixing portion is formed in a region of the outer peripheral portion of the light distributing portion excluding a region on an outer side portion in a vehicle widthwise direction.

12. The saddle-riding type automotive vehicle as claimed in claim 11, in which the light distributing portion is of an elliptical or oval shape having its longitudinal direction oriented in the vehicle widthwise direction; and
    in which the fixing portion is formed above and/or below the light distributing portion.

13. The saddle-riding type automotive vehicle as claimed in claim 11, in which the electric power line has its tip portion provided with a removable connector to a mounting portion of the circuit board and extends from a portion in the circuit board corresponding to an upper and widthwise intermediate portion towards the outside of the lens portion; and
    in which one of the fixing portions is formed above and on one side of the vehicle widthwise direction of the light distributing portion and the other of the fixing portions is formed below and on the other side of the vehicle widthwise direction of the vehicle widthwise direction.

14. The saddle-riding type automotive vehicle as claimed in claim 13, in which left and right pairs or more of the lamp units are disposed inwardly of the front fairing; and in which the one side is an outside of the vehicle widthwise direction and the other side is an inner side of the vehicle widthwise direction.

15. A saddle-riding type automotive vehicle, which comprises:
a front fairing for enclosing a front portion of a vehicle body structure;
a headlamp device disposed within the front fairing and comprising one or more lamp units;
the lamp unit being a direct lighting type and comprising one or more light emitting portions having an LED chip mounted on a circuit board, and one or more lens portions for projecting light, emitted from the light emitting portion, in a direction forwardly of the device, the lens portion receiving the light directly from the light emitting portion;
the front fairing being formed to represent a streamlined shape and bulged gradually outwardly of a vehicle widthwise direction and upwardly from a tip portion thereof to the rearward; and
the headlamp device being disposed proximate to a lower end of the front fairing, wherein
each of the lamp units has a plurality of lens portions; and
wherein the lens portion of the lamp unit on the inner side of the vehicle widthwise direction or the lens portion of the lamp unit on a front side of the vehicle is formed in an elliptical or oval shape having its longitudinal direction oriented in the vehicle widthwise direction.

16. A saddle-riding type automotive vehicle, which comprises:
a front fairing for enclosing a front portion of a vehicle body structure;
a headlamp device disposed within the front fairing and comprising one or more lamp units;
the lamp unit being a direct lighting type and comprising one or more light emitting portions having an LED chip mounted on a circuit board, and one or more lens portions for projecting light, emitted from the light emitting portion, in a direction forwardly of the device, the lens portion receiving the light directly from the light emitting portion;
the front fairing being formed to represent a streamlined shape and bulged gradually outwardly of a vehicle widthwise direction and upwardly from a tip portion thereof to the rearward;
the headlamp device being disposed proximate to a lower end of the front fairing, wherein the headlamp device is disposed on a lower side of an inner space defined in the front fairing; and
a voltage converting unit, configured to supply an electric power to the head lamp device, is disposed on an upper side of the inner space.

17. A saddle-riding type automotive vehicle, which comprises:
a front fairing for enclosing a front portion of a vehicle body structure;
a headlamp device disposed within the front fairing and comprising one or more lamp units;
the lamp unit being a direct lighting type and comprising one or more light emitting portions having an LED chip mounted on a circuit board, and one or more lens portions for projecting light, emitted from the light emitting portion, in a direction forwardly of the device, the lens portion receiving the light directly from the light emitting portion;
the front fairing being formed to represent a streamlined shape and bulged gradually outwardly of a vehicle widthwise direction and upwardly from a tip portion thereof to the rearward; and
the headlamp device being disposed proximate to a lower end of the front fairing and the lens portions has a lens region, which is positioned forwardly of the light emitting portion and is exposed outwardly through the front fairing and the lens region has an outer peripheral surface receded inwardly of the front fairing structure beyond an outer surface of the front fairing,
wherein the outer peripheral surface of the lens regions is gradually inclined in a direction inwardly of the vehicle body structure towards a lower portion of the lens region from the upper end to the lower end of the lens region.

* * * * *